(12) United States Patent
Ekanayake et al.

(10) Patent No.: US 9,828,887 B2
(45) Date of Patent: Nov. 28, 2017

(54) POWER GENERATION SYSTEM HAVING COMPRESSOR CREATING EXCESS AIR FLOW AND TURBO-EXPANDER TO INCREASE TURBINE EXHAUST GAS MASS FLOW

(71) Applicant: General Electric Company, Schenectady, NY (US)

(72) Inventors: Sanji Ekanayake, Mableton, GA (US); Dale Joel Davis, Greenville, SC (US); Kihyung Kim, Atlanta, GA (US); Alston Ilford Scipio, Mableton, GA (US); Leslie Yung Min Tong, Roswell, GA (US)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 14/662,805

(22) Filed: Mar. 19, 2015

(65) Prior Publication Data

US 2016/0273400 A1    Sep. 22, 2016

(51) Int. Cl.
*F02C 6/00* (2006.01)
*F01K 23/10* (2006.01)
(Continued)

(52) U.S. Cl.
CPC ............ *F01K 23/10* (2013.01); *F01D 13/003* (2013.01); *F02C 3/04* (2013.01); *F02C 3/10* (2013.01);
(Continued)

(58) Field of Classification Search
CPC ...... F02C 9/18; F02C 6/00; F02C 6/02; F02C 6/08; F01K 23/10
See application file for complete search history.

(56) References Cited

U.S. PATENT DOCUMENTS 4,476,674 A * 10/1984 Berman ................ F01K 23/062
60/39.182
5,363,641 A    11/1994 Dixon et al.
(Continued)

FOREIGN PATENT DOCUMENTS

EP    2 204 554 A2    7/2010
EP    2 284 375 A1    2/2011
(Continued)

OTHER PUBLICATIONS

European Search Report and Written Opinion issued in connection with related EP Application No. 16160337.8 on Jul. 22, 2016.
(Continued)

*Primary Examiner* — Pascal M Bui Pho
*Assistant Examiner* — Thuyhang Nguyen
(74) *Attorney, Agent, or Firm* — Ernest G. Cusick; Hoffman Warnick LLC

(57) ABSTRACT

A power generation system may include: a first gas turbine system including a first turbine component, a first integral compressor and a first combustor to which air from the first integral compressor and fuel are supplied. The first integral compressor has a flow capacity greater than an intake capacity of the first combustor and/or the first turbine component, creating an excess air flow. A second gas turbine system may include similar components to the first except but without excess capacity in its compressor. A turbo-expander may be operatively coupled to the second gas turbine system. Control valves may control flow of the excess air flow from the first gas turbine system to at least one of the second gas turbine system and the turbo-expander, and flow of a discharge of the turbo-expander to an exhaust of at least one of the first turbine component and the second turbine component.

14 Claims, 1 Drawing Sheet

(51) Int. Cl.
*F01D 13/00* (2006.01)
*F02C 3/10* (2006.01)
*F02C 3/13* (2006.01)
*F02C 6/02* (2006.01)
*F02C 6/08* (2006.01)
*F02C 9/18* (2006.01)
*F02C 3/04* (2006.01)

(52) U.S. Cl.
CPC ............... *F02C 3/13* (2013.01); *F02C 6/00* (2013.01); *F02C 6/02* (2013.01); *F02C 6/08* (2013.01); *F02C 9/18* (2013.01); *F05D 2220/72* (2013.01); *F05D 2230/80* (2013.01); *Y02E 20/16* (2013.01)

(56) References Cited

U.S. PATENT DOCUMENTS

| | | | |
|---|---|---|---|
| 5,433,069 | A | 7/1995 | Houghton et al. |
| 5,992,139 | A | 11/1999 | Kesseli |
| 6,415,595 | B1 | 7/2002 | Wilmot, Jr. et al. |
| 6,430,915 | B1* | 8/2002 | Wiant ............... F01K 23/067 60/39.12 |
| 6,442,941 | B1 | 9/2002 | Anand et al. |
| 6,543,234 | B2* | 4/2003 | Anand ............... F02C 7/32 60/39.182 |
| 6,718,771 | B1 | 4/2004 | Kopko |
| 8,245,493 | B2 | 8/2012 | Minto |
| 8,355,854 | B2 | 1/2013 | Childers |
| 8,453,462 | B2 | 6/2013 | Wichmann et al. |
| 8,479,523 | B2 | 7/2013 | Berry |
| 9,297,316 | B2 | 3/2016 | Scipio et al. |
| 9,488,102 | B2* | 11/2016 | Santini ............... F01D 15/10 |
| 9,540,998 | B2 | 1/2017 | Schlak |
| 2001/0000091 | A1 | 4/2001 | Nakhamkin et al. |
| 2004/0045300 | A1 | 3/2004 | Dovali-Solis |
| 2006/0254280 | A1* | 11/2006 | Briesch ............... F01D 19/00 60/772 |
| 2007/0033942 | A1 | 2/2007 | Benz et al. |
| 2007/0125063 | A1 | 6/2007 | Evulat |
| 2007/0130912 | A1 | 6/2007 | Kraft et al. |
| 2007/0130957 | A1 | 6/2007 | Hoffmann et al. |
| 2008/0104938 | A1 | 5/2008 | Finkenrath et al. |
| 2009/0051167 | A1 | 2/2009 | Dinu |
| 2009/0297333 | A1 | 12/2009 | Mirsky et al. |
| 2010/0083660 | A1 | 4/2010 | Nakhamkin |
| 2011/0181050 | A1 | 7/2011 | Dinu |
| 2011/0271689 | A1 | 11/2011 | Lacy et al. |
| 2012/0017602 | A1* | 1/2012 | Hansen ............... F01D 19/00 60/778 |
| 2012/0023963 | A1 | 2/2012 | Wichmann et al. |
| 2012/0047906 | A1* | 3/2012 | Dinu ............... F02C 3/13 60/772 |
| 2013/0104816 | A1 | 5/2013 | Nenmeni et al. |
| 2013/0125525 | A1 | 5/2013 | Hein et al. |
| 2013/0125557 | A1 | 5/2013 | Scipio et al. |
| 2013/0227954 | A1 | 9/2013 | Marini et al. |
| 2013/0318987 | A1 | 12/2013 | Ekanayake et al. |
| 2014/0026588 | A1 | 1/2014 | Velez |
| 2014/0044517 | A1 | 2/2014 | Saha et al. |
| 2014/0250902 | A1* | 9/2014 | Kraft ............... F02C 6/16 60/773 |
| 2014/0352318 | A1 | 12/2014 | Kraft |
| 2014/0366547 | A1 | 12/2014 | Kraft et al. |
| 2014/0373551 | A1 | 12/2014 | Kraft et al. |
| 2015/0233296 | A1 | 8/2015 | Kraft |
| 2015/0251766 | A1 | 9/2015 | Atkey |
| 2015/0292402 | A1 | 10/2015 | Razak |
| 2015/0330869 | A1 | 11/2015 | Ziarno |
| 2016/0076461 | A1 | 3/2016 | Kawai et al. |
| 2016/0273393 | A1 | 9/2016 | Ekanayake et al. |
| 2016/0273395 | A1 | 9/2016 | Ekanayake et al. |
| 2016/0273396 | A1 | 9/2016 | Ekanayake et al. |
| 2016/0273399 | A1 | 9/2016 | Ekanayake et al. |
| 2016/0273400 | A1 | 9/2016 | Ekanayake et al. |

FOREIGN PATENT DOCUMENTS

| | | |
|---|---|---|
| EP | 2 562 366 A2 | 2/2013 |
| JP | 2015-045330 A | 3/2015 |
| WO | 93/11351 A1 | 6/1993 |
| WO | 01/04476 A1 | 1/2001 |
| WO | 2012/128928 A1 | 9/2012 |
| WO | 2013151909 A1 | 10/2013 |
| WO | 2014/033220 A1 | 3/2014 |
| WO | 2014066276 A2 | 5/2014 |
| WO | 2015028597 A1 | 3/2015 |

OTHER PUBLICATIONS

Extended European Search Report and Opinion issued in connection with related EP Application No. 16160336.0 dated Aug. 11, 2016.

Extended European Search Report and Opinion issued in connection with related EP Application No. 16159853.7 dated Aug. 12, 2016.

Extended European Search Report and Opinion issued in connection with corresponding EP Application No. 16160195.0 dated Aug. 16, 2016.

Extended European Search Report and Opinion issued in connection with related EP Application No. 16160334.5 dated Aug. 17, 2016.

Extended European Search Report and Opinion issued in connection with related EP Application No. 16160364.2 dated Aug. 17, 2016.

Extended European Search Report and Opinion issued in connection with related EP Application No. 16160216.4 dated Aug. 17, 2016.

Extended European Search Report and Opinion issued in connection with related EP Application No. 16159851.1 dated Aug. 18, 2016.

U.S. Appl. No. 14/662,760, filed Mar. 19, 2015, Sanji Ekanayake et al.

U.S. Appl. No. 14/662,770, filed Mar. 19, 2015, Sanji Ekanayake et al.

U.S. Appl. No. 14/662,780, filed Mar. 19, 2015, Sanji Ekanayake et al.

U.S. Appl. No. 14/662,785, filed Mar. 19, 2015, Sanji Ekanayake et al.

U.S. Appl. No. 14/662,796, filed Mar. 19, 2015, Sanji Ekanayake et al.

U.S. Appl. No. 14/662,800, filed Mar. 19, 2015, Sanji Ekanayake et al.

U.S. Appl. No. 14/662,803, filed Mar. 19, 2015, Sanji Ekanayake et al.

U.S. Appl. No. 14/662,785, Office Action 1 dated Mar. 9, 2017, (GEEN-0632-US), 36 pages.

U.S. Appl. No. 14/662,800, Office Action 1 dated Mar. 14, 2017, (GEEN-0634-US), 35 pages.

U.S. Appl. No. 14/662,796, Office Action 1 dated Mar. 21, 2017, (GEEN-0633-US), 47 pages.

Anonymous, "Understanding Aeroderivative Gas Turbines," 2012, 1 page, retrieved from: https://web.archive.org/web/20130326054141/http://www.turbinetechnics.com/about-us/understanding-aeroderivative-gas-turbines.

U.S. Appl. No. 14/662,760, Office Action 1 dated Apr. 20, 2017, (GEEN-0629-US), 31 pages.

U.S. Appl. No. 14/662,803, Office Action 1 dated May 4, 2017, (GEEN-0635-US), 32 pages.

U.S. Appl. No. 14/662,780, Office Action 1 dated Jun. 29, 2017, (GEEN-0631-US), 32 pages.

U.S. Appl. No. 14/662,770, Office Action 1 dated Jul. 28, 2017, (GEEN-0630-US), 63 pages.

U.S. Appl. No. 14/662,800, Final Office Action 1 dated Aug. 21, 2017, (GEEN-0634-US), 14 pages.

U.S. Appl. No. 14/662,785, Final Office Action 1 dated Aug. 25, 2017, (GEEN-0632-US), 42 pages.

* cited by examiner

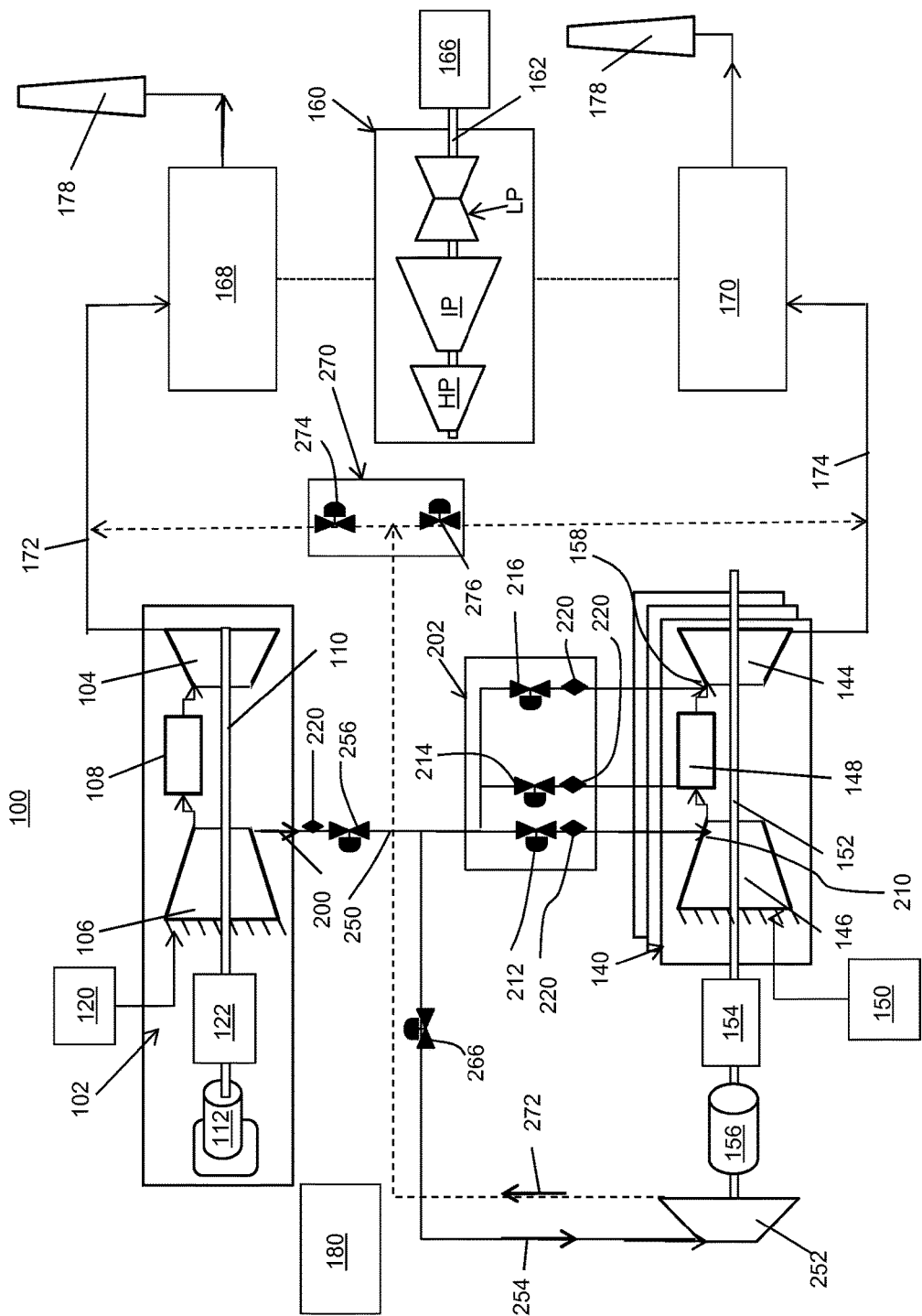

POWER GENERATION SYSTEM HAVING COMPRESSOR CREATING EXCESS AIR FLOW AND TURBO-EXPANDER TO INCREASE TURBINE EXHAUST GAS MASS FLOW

CROSS-REFERENCE TO RELATED APPLICATIONS

This application is related to co-pending US application numbers: application Ser. No. 14/662,760, application Ser. No. 14/662,770, application Ser. No. 14/662,780, application Ser. No. 14/662,785, application Ser. No. 14/662,796, application Ser. No. 14/662,800, application Ser. No. 14/662,803, all filed on Mar. 19, 2015.

BACKGROUND OF THE INVENTION

The disclosure relates generally to power generation systems, and more particularly, to a power generation system including a gas turbine system having a compressor creating an excess air flow and a turbo-expander to augment generator output and increase turbine exhaust gas mass flow of another gas turbine system, which turbine exhaust(s) may be used in one or more steam generators.

Power generation systems oftentimes employ one or more gas turbine systems, which may be coupled with one or more steam turbine systems, to generate power. A gas turbine system may include a multi-stage axial flow compressor having a rotating shaft. Air enters the inlet of the compressor and is compressed by the compressor blade stages and then is discharged to a combustor where fuel, such as natural gas, is burned to provide a high energy combustion gas flow to drive a turbine component. In the turbine component, the energy of the hot gases is converted into work, some of which may be used to drive the integral compressor through a rotating shaft, with the remainder available for useful work to drive a load such as a generator via a rotating shaft (e.g., an extension of the rotating shaft) for producing electricity. A number of gas turbine systems may be employed in parallel within a power generation system. In a combined cycle system, one or more steam turbine systems may also be employed with the gas turbine system(s). In this setting, a hot exhaust gas from the gas turbine system(s) is fed to one or more heat recovery steam generators (HRSG) to create steam, which is then fed to a steam turbine component having a separate or integral rotating shaft with the gas turbine system(s). In any event, the energy of the steam is converted into work, which can be employed to drive a load such as a generator for producing electricity.

When a power generation system is created, its parts are configured to work together to provide a system having a desired power output. The ability to increase power output on demand and/or maintain power output under challenging environmental settings is a continuous challenge in the industry. For example, on hot days, the electric consumption is increased, thus increasing power generation demand. Another challenge of hot days is that as temperature increases, compressor flow decreases, which results in decreased generator output. One approach to increase power output (or maintain power output, e.g., on hot days) is to add components to the power generation system that can increase air flow to the combustor of the gas turbine system(s). One approach to increase air flow is adding a storage vessel to feed the gas turbine combustor. This particular approach, however, typically requires a separate power source for the storage vessel, which is not efficient.

Another approach to increasing air flow is to upgrade the compressor. Currently, compressors have been improved such that their flow capacity is higher than their predecessor compressors. These new, higher capacity compressors are typically manufactured to either accommodate new, similarly configured combustors, or older combustors capable of handling the increased capacity. A challenge to upgrading older gas turbine systems to employ the newer, higher capacity compressors is that there is currently no mechanism to employ the higher capacity compressors with systems that cannot handle the increased capacity without upgrading other expensive parts of the system. Other parts that oftentimes need to be upgraded simultaneously with a compressor upgrade include but are not limited to the combustor, gas turbine component, generator, transformer, switchgear, HRSG, steam turbine component, steam turbine control valves, etc. Consequently, even though a compressor upgrade may be theoretically advisable, the added costs of upgrading other parts renders the upgrade ill-advised due to the additional expense.

BRIEF DESCRIPTION OF THE INVENTION

A first aspect of the disclosure provides a power generation system including a first gas turbine system including a first turbine component, a first integral compressor and a first combustor to which air from the first integral compressor and fuel are supplied, the first combustor arranged to supply hot combustion gases to the first turbine component, and the first integral compressor having a flow capacity greater than an intake capacity of at least one of the first combustor and the first turbine component, creating an excess air flow; a second gas turbine system including a second turbine component, a second compressor and a second combustor to which air from the second compressor and fuel are supplied, the second combustor arranged to supply hot combustion gases to the second turbine component; a turbo-expander operatively coupled to the second gas turbine system; a first control valve system controlling flow of the excess air flow along an excess air flow path from the first gas turbine system to at least one of the second gas turbine system and the turbo-expander; and a second control valve controlling flow of a discharge of the turbo-expander to an exhaust of at least one of the first turbine component and the second turbine component.

A second aspect of the disclosure provides a power generation system, comprising: a first gas turbine system including a first turbine component, a first integral compressor and a first combustor to which air from the first integral compressor and fuel are supplied, the first combustor arranged to supply hot combustion gases to the first turbine component, and the first integral compressor having a flow capacity greater than an intake capacity of at least one of the first combustor and the first turbine component, creating an excess air flow; a second gas turbine system including a second turbine component, a second compressor and a second combustor to which air from the second compressor and fuel are supplied, the second combustor arranged to supply hot combustion gases to the second turbine component; a turbo-expander operatively coupled to the second gas turbine system; a first control valve system controlling flow of the excess air flow along an excess air flow path from the first gas turbine system to at least one of the second gas turbine system and the turbo-expander; and a second control valve controlling flow of a discharge of the turbo-expander to an exhaust of at least one of the first turbine component and the second turbine component, wherein the second control valve system includes a first control valve controlling a first portion of the discharge of the turbo-expander to an exhaust of the first turbine component and a second control valve controlling a second portion of the discharge of the turbo-expander to an exhaust of the second turbine component, wherein the second gas turbine system further includes a rotating shaft coupling the second compressor, the second turbine component, a starter motor and the turbo-expander.

A third aspect of the disclosure provides a method comprising: extracting an excess air flow from a first integral compressor of a first gas turbine system including a first turbine component, the first integral compressor and a first combustor to which air from the first integral compressor and fuel are supplied, the first integral compressor having a flow capacity greater than an intake capacity of at least one of the first combustor and the first turbine component; directing the excess air flow along an excess air flow path to at least one of: a second gas turbine system including a second turbine component, a second compressor and a second combustor to which air from the second compressor and fuel are supplied, the second combustor arranged to supply hot combustion gases to the second turbine component, and a turbo-expander operatively coupled to the second gas turbine system; and directing flow of a discharge of the turbo-expander to an exhaust of at least one of the first turbine component and the second turbine component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure, in which:

FIG. 1 shows a schematic diagram of a power generation system according to embodiments of the invention.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure provides a power generation system including a gas turbine system including a compressor that creates an excess air flow. Embodiments of the invention provide ways to employ the excess air flow to improve output of the power generation system.

Referring to FIG. 1, a schematic diagram of a power generation system 100 according to embodiments of the invention is provided. System 100 includes a first gas turbine system 102. First gas turbine system 102 may include, among other components, a first turbine component 104, a first integral compressor 106 and a first combustor 108. As used herein, first "integral" compressor 106 is so termed as compressor 106 and turbine component 104 may be integrally coupled together by, inter alia, a common compressor/turbine rotating shaft 110 (sometimes referred to as rotor 110). This structure is in contrast to many compressors that are separately powered, and not integral with turbine component 104.

Combustor 108 may include any now known or later developed combustor system generally including a combustion region and a fuel nozzle assembly. Combustor 108 may take the form of an annular combustion system, or a can-annular combustion system (as is illustrated in the FIGURES). In operation, air from first integral compressor 106 and a fuel, such as natural gas, are supplied to combustor 108. Diluents may also be optionally delivered to combustor 108 in any now known or later developed fashion. Air drawn by first integral compressor 106 may be passed through any now known or later developed inlet filter housing 120. As understood, combustor 108 is arranged to supply hot combustion gases to first turbine component 104 by combustion of the fuel and air mixture. In turbine component 104, the energy of the hot combustion gases is converted into work, some of which may be used to drive compressor 106 through rotating shaft 110, with the remainder available for useful work to drive a load such as, but not limited to, a generator 122 for producing electricity, and/or another turbine via rotating shaft 110 (an extension of rotating shaft 110). A starter motor 112 such as but not limited to a conventional starter motor or a load commutated inverter (LCI) motor (shown) may also be coupled to rotating shaft 110 for starting purposes of first gas turbine system 102. Turbine component 104 may include any now known or later developed turbine for converting a hot combustion gas flow into work by way of rotating shaft 110.

In one embodiment, gas turbine system 102 may include a model MS7001FB, sometimes referred to as a 7FB engine, commercially available from General Electric Company, Greenville, S.C. The present invention, however, is not limited to any one particular gas turbine system and may be implemented in connection with other systems including, for example, the MS7001FA (7FA) and MS9001FA (9FA) models of General Electric Company.

In contrast to conventional gas turbine system models, first integral compressor 106 has a flow capacity greater than an intake capacity of turbine component 104 and/or first combustor 108. That is, compressor 106 is an upgraded compressor compared to a compressor configured to match combustor 108 and turbine component 104. As used herein, "capacity" indicates a flow rate capacity. For example, an initial compressor of gas turbine system 102 may have a maximum flow rate capacity of about 487 kilogram/second (kg/s) (1,075 pound-mass/second (lbm/s)) and turbine component 104 may have a substantially equal maximum flow capacity, i.e., around 487 kg/s. Here, however, compressor 108 has replaced the initial compressor and may have an increased maximum flow capacity of, for example, about 544 kg/s (1,200 lbm/s), while turbine component 104 continues to have a maximum flow capacity of, e.g., around 487 kg/s. (Where necessary, starter motor 112 may also have been upgraded, e.g., to an LCI drive motor as illustrated, to accommodate increased power requirements for startup of first integral compressor 106). Consequently, turbine component 104 cannot take advantage of all of the capacity of compressor 106, and an excess air flow 200 is created by compressor 106 above a maximum capacity of turbine component 104. Similarly, the flow capacity of integral compressor 106 may exceed the maximum intake capacity of combustor 108. In a similar fashion, the power output of turbine component 104 if exposed to the full flow capacity of integral compressor 106 could exceed a maximum allowed input for generator 122. While particular illustrative flow rate values have been described herein, it is emphasized that the flow rate capacities may vary widely depending on the gas turbine system and the new, high capacity integral compressor 106 employed. As will be described herein, the present invention provides various embodiments for power generation system 100 to employ the excess air flow in other parts of power generation system 100.

In the embodiment shown in FIG. 1, power generation system 100 also includes one or more second gas turbine system(s) 140. Each second gas turbine system 140 may include a second turbine component 144, a second compressor 146 and a second combustor 148. Each second gas turbine system 140 may be substantially similar to first gas turbine system 102 except compressor 146 thereof has not been upgraded or replaced and continues to have a flow capacity configured to match that of its respective turbine component 144 and/or combustor 148. As described herein relative to first integral compressor 106, air from second compressor 146 is supplied to second combustor 148 along with a fuel, and second combustor 148 is arranged to supply hot combustion gases to second turbine component 144. Diluents may also be optionally delivered to second combustor 148 in any now known or later developed fashion. Air drawn by second compressor 146 may be passed through any now known or later developed inlet filter housing 150. In second turbine component 144, the energy of the hot combustion gases is converted into work, some of which is used to drive compressor 146 through rotating shaft 152, with the remainder available for useful work to drive a load such as, but not limited to, a generator 154 for producing electricity, and/or another turbine via rotating shaft 152 (an extension of rotating shaft 152). A starter motor 156 for start up operations relative to second gas turbine system 140 may also be coupled to rotating shaft 152.

Second turbine component 144 may also include one or more turbine nozzle cooling inlet(s) 158. As understood in the art, a stationary nozzle in a turbine component may include a number of inlets (not shown) for a cooling fluid flow to be injected for cooling, among other things, the nozzles of the turbine component. Passages within and about the nozzles direct the cooling fluid where necessary. Although only one inlet is shown at a first stage of turbine component 144 for clarity, it is understood that each stage of turbine component 144 may include one or more inlets, e.g., circumferentially spaced about the turbine component. In addition, although turbine nozzle cooling inlet 158 is illustrated as entering at or near a first stage of second turbine component 144, as understood, inlet(s) may be provided at practically any stage.

As also shown in FIG. 1, in one embodiment, power generation system 100 may optionally take the form of a combined cycle power plant that includes a steam turbine system 160. Steam turbine system 160 may include any now known or later developed steam turbine arrangement. In the example shown, high pressure (HP), intermediate pressure (IP) and low pressure (LP) sections are illustrated; however, not all are necessary in all instances. As known in the art, in operation, steam enters an inlet of the steam turbine section(s) and is channeled through stationary vanes, which direct the steam downstream against blades coupled to a rotating shaft 162 (rotor). The steam may pass through the remaining stages imparting a force on the blades causing rotating shaft 162 to rotate. At least one end of rotating shaft 162 may be attached to a load or machinery such as, but not limited to, a generator 166, and/or another turbine, e.g., one of gas turbines 102, 140. Steam for steam turbine system 160 may be generated by one or more steam generators 168, 170, i.e., heat recovery steam generators (HRSGs). HRSG 168 may be coupled to an exhaust 172 of first turbine system 102, and HSRG 170 may be coupled to an exhaust 174 of second turbine system(s) 140. That is, exhaust 172, 174 of gas turbine system 102 and/or gas turbine system(s) 104, respectively, may be supplied to at least one HRSG 168, 170 for powering steam turbine system 160. Each gas turbine system may be coupled to a dedicated HRSG, or some systems may share an HRSG. In the latter case, although two HRSGs 168, 170 are illustrated, only one may be provided and both exhausts 172, 174 directed thereto. After passing through steam generators 168, 170, the combustion gas flow, now depleted of heat, may be exhausted via any now known or later developed emissions control systems 178, e.g., stacks, selective catalytic reduction (SCR) units, nitrous oxide filters, etc. While FIG. 1 shows a combined cycle embodiment, it is emphasized that steam turbine system 160 including steam generators 168, 170 may be omitted. In this latter case, exhaust 172, 174 would be passed directly to emission control systems 180 or used in other processes.

Power generation system 100 may also include any now known or later developed control system 180 for controlling the various components thereof. Although shown apart from the components, it is understood that control system 180 is electrically coupled to all of the components and their respective controllable features, e.g., valves, pumps, motors, sensors, gearing, electric grid, generator controls, etc.

Returning to details of first gas turbine system 102, as noted herein, first integral compressor 106 has a flow capacity greater than an intake capacity of turbine component 104 and/or first combustor 108, which creates an excess air flow 200. Excess air flow 200 is shown as a flow extracted from first integral compressor 106 at a discharge thereof. It is emphasized, however, that excess air flow 200 may be extracted at any stage of integral compressor 106 where desired, e.g., at one or more locations upstream of the discharge, at the discharge and one or more locations upstream of the discharge, etc., using appropriate valves and related control systems. In any event, excess air flow 200 eventually passes along an excess air flow path 250, which may include one or more pipes to second turbine system(s) 140. In the FIG. 1 embodiment, a control valve system 202 is provided for controlling flow of excess air flow 200 to second gas turbine system(s) 140. Although illustrated as if excess air flow 200 is directed to just one second gas turbine system 140, it is understood that the excess air flow may be directed to one or more second gas turbine system(s) 140, where desired and where the excess air flow can support more than one system.

Power generation system 100 may also include a turbo-expander 252 operatively coupled to second turbine system 140. Turbo-expander 252 may include any now known or later developed axial or centrifugal flow turbine capable of receiving a high pressure gas, such as air or steam, and generating work from the expansion of the high pressure gas. In the instance case, at least a portion 254 of excess air flow 200 may be employed to power turbo-expander 252. At least a portion 254 of excess air flow 200 can be augmented by another source of high pressure gas, e.g., steam from HRSG 168 and/or 170, or another pressurized air source, if necessary. Operation and advantages of turbo-expander 252 will be described herein.

Excess air flow 200 can be directed from first gas turbine system 102 to second turbine system 140 and/or turbo-expander 252 in a number of ways. In one embodiment, a first control valve system 202 controls flow of the excess air flow 200 along an excess air flow path 250 to at least one of second gas turbine system 140 and turbo-expander 252. In terms of second gas turbine system 140, first control valve system 202 may control flow of excess air flow 200 to at least one of a discharge 210 of second compressor 146, second combustor 148 and turbine nozzle cooling inlet(s) 158 of second turbine component 144. Control valve system 202 may include any number of valves necessary to supply the desired part of second turbine system 140 with at least a portion of excess air flow 200. As illustrated, control valve system 202 may include three valves. A first control valve 212 may control a first portion of excess air flow 200 to discharge 210 of second compressor 146. In this fashion, excess air flow 200 can add to the flow of air from compressor 146 without additional energy consumption thereby. A second control valve 214 may control a second portion of excess air flow 200 to second combustor 148, thus providing additional air for combustion. A third control valve 216 may control a third portion of excess air flow 200 to turbine nozzle cooling inlet(s) 158 of second turbine component 144 to provide a cooling fluid for, among other things, the nozzles of the turbine component. In operation the example shown may function as follows: first, with control valve 210 open and control valves 212, 214 closed, excess air flow 200 is supplied to discharge 210 of second compressor 146; second, with control valves 210 and 216 closed and control valve 214 open, excess air flow 200 is supplied to combustor 148; and finally, with control valves 210, 212 closed and control valve 216 open, excess air flow 200 is supplied to turbine nozzle cooling inlet(s) 158 of second turbine component 144. First control valve system 202 may also include control valve 256 for controlling excess air flow 200 in excess air flow path 250. In terms of excess air flow 200 delivery to turbo-expander 252, first control valve system 202 may also include a control valve 266 controlling at least portion 254 of excess air flow 200 supplied to turbo-expander 252 from excess air flow path 250, i.e., to an inlet of turbo-expander 252 for powering the turbo-expander.

A second control valve system 270 may control flow of a discharge 272 of turbo-expander 252 to an exhaust of at least one of first turbine component 104 and second turbine component 144 (piping shown in dashed lines for clarity). That is, second control valve system 270 controls flow of a portion of discharge 272 to exhaust 172 of first turbine component 172 and flow of a portion of discharge 272 to exhaust 174 of second turbine component 144. As illustrated, second control valve system 270 may include a first control valve 274 controlling a first portion of discharge 272 of turbo-expander 252 to a exhaust 172 of first turbine component 104, and a second control valve 276 controlling a second portion of discharge 272 of turbo-expander 252 to exhaust 174 of second turbine component 144. Each portion of discharge 272 can be any percentage of discharge 272, including zero. That is, any portion of discharge 272 can be delivered to first turbine component exhaust 172 and second turbine component exhaust 174, or all of discharge 272 can be delivered to exhaust 172 or exhaust 174.

With further regard to each control system 202, 270, each control valve thereof may be positioned in any position between open and closed to provide the desired partial flows to the stated components. Further, while one passage to each component is illustrated after each control valve, it is emphasized that further piping and control valves may be provided to further distribute the respective portion of excess air flow 200 to various sub-parts, e.g., numerous turbine nozzle cooling inlets 158 on second turbine component 144, numerous combustion cans of combustor 148, various inputs to turbo-expander 252, etc. As also illustrated, at least one sensor 220 may be provided for measuring a flow rate of at least a portion of excess air flow 200, e.g., as extracted from first integral compressor 106, after each control valve 212, 214, 216, etc. Each sensor 220 may be operably coupled to control valve system(s) 202, 270, each which may include any now known or later developed industrial control for automated operation of the various control valves illustrated, and control system 180. Other sensors 200 for measuring flow can be provided where necessary throughout power generation system 100.

As noted, control valve 256 may operate to control the amount of excess air flow 200 in excess air flow path 250, and a control valve 266 may operate to control the amount of air 254 provided to turbo-expander 252 from excess air flow path 250. Control valve systems 202, 270 and hence flow of excess air flow 200 and operation of turbo-expander 252 may be controlled using any now known or later developed industrial controller, which may be part of an overall power generation system 100 control system 180. Control system 180 may control operation of all of the various components of power generation system 100 in a known fashion, including controlling control valve system 202.

Power generation system 100 including first gas turbine system 102 having first integral compressor 106 that creates an excess air flow 200 provides a number of advantages compared to conventional systems. For example, compressor 106 may improve the power block peak, base and hot-day output of power generation system 100 at a lower cost relative to upgrading all compressors in the system, which can be very expensive where a number of gas turbines are employed. In addition embodiments of the invention, reduce the relative cost of an upgraded compressor, i.e., compressor 106, and in-turn improves the viability and desirability of an upgraded compressor by providing a way to efficiently consume more of the excess air flow. Further, power generation system 100 including first integral compressor 106 expands the operational envelope of system 100 by improving project viability in the cases where any one or more of the following illustrative sub-systems are undersized: turbine component 104, generator 122, transformer (not shown), switchgear, HRSG 168, steam turbine system 160, steam turbine control valves, etc. In this fashion, system 100 provides an improved case to upgrade a single compressor in, for example, a two gas turbine and one steam turbine combined cycle (2×1 CC) system as compared to upgrading both compressors 106, 146 or the do-nothing case.

Turbo-expander 252 may provide a number of advantages alone or in conjunction with first integral compressor 106 that creates excess air flow 200. One advantage is that it can provide additional turning power for rotating shaft 152 during start up so as to augment starter motor 156 power. As illustrated, second gas turbine system 140 may include rotating shaft 152 coupling second compressor 146, second turbine component 144, starter motor 156 and turbo-expander 252. Generator 154 may also be coupled to rotating shaft 152. Starter motor 156 may include any now known or later developed motor for start up of second gas turbine system 140. As understood in the art, start up may include starter motor 156 turning at a gear speed (i.e., the speed at which rotating shaft 152 is continually turned so as to prevent bowing thereof), then increased to purge speed (i.e., speed that allows air to flow through) under influence of the motor, then reduced speed at which combustor 148 ignites an initial fuel flow. Subsequently, rotating shaft 152 and the rest of system accelerates under influence of motor 156 until it reaches full speed, no load condition (FSNL). At that point, gas turbine system 140 is not generating power, but is self-sustaining, and fuel within combustor 148 is controlling speed. Subsequently, gas turbine system 140 may be loaded (closing breaker) so it begins to generate power using generator 154, after which adjustments such as fuel flow to combustor 148, vanes in second turbine component 144, etc., can be made until full speed, full load (FSFL) status is attained. A similar start up process may be employed using LCI motor 112 on first gas turbine system 102. In some instances where components of second gas turbine system 140 have been upgraded, the initial starter motor 156 may be undersized. That is, components such as second compressor 146 and/or second turbine component 144 may be sized such that starter motor 156 has inadequate power to function for starting up second gas turbine system 140. However, with the provision of turbo-expander 252 additional turning power may be provided to rotating shaft 152 during start up so as to augment starter motor 156. In this fashion, an undersized starter motor 156 may not need to be replaced and the costs of a larger motor such as a load commutated inverter (LCI) motor can be avoided. (First gas turbine system 102 is shown with an LCI motor 112). Additionally, the torque output of turbo-expander 252 can also augment generator 154 power output during periods of peak load operation where excess air flow 200 supply from first compressor 106 is greater than the amount that can be consumed by second gas turbine system(s) 140.

Another advantage of turbo-expander 252 according to embodiments of the invention is that discharge 272 thereof has a temperature greater than exhausts 172, 174 of first turbine component 104 and second turbine component 144, respectively. Consequently, delivery of discharge 272 of turbo-expander 252 to one or both of exhausts 172, 174, i.e., using second control valve system 270, acts to heat one or more exhausts 172, 174, add gas mass flow to one or more exhausts 172, 174 and increase output of one or both HRSGs 168, 170 in creating steam for steam turbine system 160.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A power generation system, comprising:
  a first gas turbine system including a first turbine component, a first integral compressor and a first combustor to which air from the first integral compressor and fuel are supplied, the first combustor arranged to supply hot combustion gases to the first turbine component, and the first integral compressor having a flow capacity greater than an intake capacity of at least one of the first combustor and the first turbine component, creating an excess air flow,
  a second gas turbine system including, a second turbine component, a second compressor and a second combustor to which air from the second compressor and fuel are supplied, the second combustor arranged to supply hot combustion gases to the second turbine component;
  a turbo-expander operatively coupled to the second gas turbine system;
  a first control valve system controlling flow of the excess air flow along an excess air flow path from the first gas turbine system to the second gas turbine system and the turbo-expander; and
  a second control valve system combining a flow of a discharge of the turbo-expander directly with an exhaust of the first turbine component and the second turbine component to increase a gas mass flow of the exhaust of at least one of the first turbine component and the second turbine component;
  wherein the exhaust of at least one of the first turbine component and the second turbine component is supplied to at least one steam generator for powering a steam turbine system.

2. The power generation system of claim 1, wherein the excess air flow is supplied to a discharge of the second compressor by the first control valve system.

3. The power generation system of claim 1, wherein the excess air flow is supplied to the second combustor by the first control valve system.

4. The power generation system of claim 1, wherein the excess air flow is supplied to a turbine nozzle cooling inlet of the second turbine component by the first control valve system.

5. The power generation system of claim 1, wherein the first control valve system controls flow of the excess air flow to at least one of a discharge of the second compressor, the second combustor and a turbine nozzle cooling inlet of the second turbine component.

6. The power generation system of claim 5, wherein the first control valve system includes a first valve controlling a first portion of the excess air flow to the discharge of the second compressor, a second valve controlling a second portion of the excess air flow to the second combustor, and a third valve controlling a third portion of the flow of the excess air flow to the turbine nozzle cooling inlets of the second turbine component.

7. The power generation system of claim 6, further comprising at least one sensor for measuring a flow rate of at least a portion of the excess air flow, each of the at least one sensor operably coupled to the first control valve system.

8. The power generation system of claim 1, wherein the second control valve system includes a first valve controlling a first portion of the discharge of the turbo-expander to the exhaust of the first turbine component and a second valve controlling a second portion of the discharge of the turbo-expander to the exhaust of the second turbine component.

9. The power generation system of claim 1, wherein the second gas turbine system further includes a rotating shaft coupling the second compressor, the second turbine component, a starter motor and the turbo-expander.

10. The power generation system of claim 1, wherein the first gas turbine system further includes a rotating shaft coupling the first integral compressor, the first turbine component, and a load commutated inverter (LCI) motor.

11. A power generation system, comprising:
a first gas turbine system including a first turbine component, a first integral compressor and a first combustor to which air from the first integral compressor and fuel are supplied, the first combustor arranged to supply hot combustion gases to the first turbine component, and the first integral compressor having a flow capacity greater than an intake capacity of at least one of the first combustor and the first turbine component, creating an excess air flow;
a second gas turbine system including a second turbine component, a second compressor and a second combustor to which air from the second compressor and fuel are supplied, the second combustor arranged to supply hot combustion gases to the second turbine component;
a turbo-expander operatively coupled to the second gas turbine system;
a first control valve system controlling flow of the excess air flow along an excess air flow path from the first gas turbine system to the second gas turbine system and the turbo-expander; and
a second control valve system combining a flow of a discharge of the turbo-expander directly with an exhaust of the first turbine component and the second turbine component to increase a gas mass flow of the exhaust of at least one of the first turbine component and the second turbine component, wherein the second control valve system includes a first valve controlling a first portion of the discharge of the turbo-expander to the exhaust of the first turbine component and a second valve controlling a second portion of the discharge of the turbo-expander to the exhaust of the second turbine component, wherein the exhaust of at least one of the first turbine component and the second turbine component is supplied to at least one steam generator for powering a steam turbine system,
wherein the second gas turbine system further includes a rotating shaft coupling the second compressor, the second turbine component, a starter motor and the turbo-expander.

12. The power generation system of claim 11, wherein the first control valve system controls flow of the excess air flow to at least one of a discharge of the second compressor, the second combustor and a turbine nozzle cooling inlet of the second turbine component.

13. The power generation system of claim 12, wherein the first control valve system includes a first valve controlling a first portion of the excess air flow to the discharge of the second compressor, a second valve controlling a second portion of the excess air flow to the second combustor, and a third valve controlling a third portion of the flow of the excess air flow to the turbine nozzle cooling inlets of the second turbine component.

14. The power generation system of claim 11, wherein the first gas turbine system further includes a rotating shaft coupling the first integral compressor, the first turbine component, and a load commutated inverter (LCI) motor.

* * * * *